Sept. 23, 1952　　　　　C. H. SCOTT　　　　　2,611,489
SKIMMER MECHANISM FOR CLARIFIERS
Filed Feb. 21, 1951　　　　　　　　　　　　5 Sheets-Sheet 1

INVENTOR
Charles H. Scott
BY
Arthur Middleton
ATTORNEY

Sept. 23, 1952 C. H. SCOTT 2,611,489
SKIMMER MECHANISM FOR CLARIFIERS
Filed Feb. 21, 1951 5 Sheets-Sheet 2
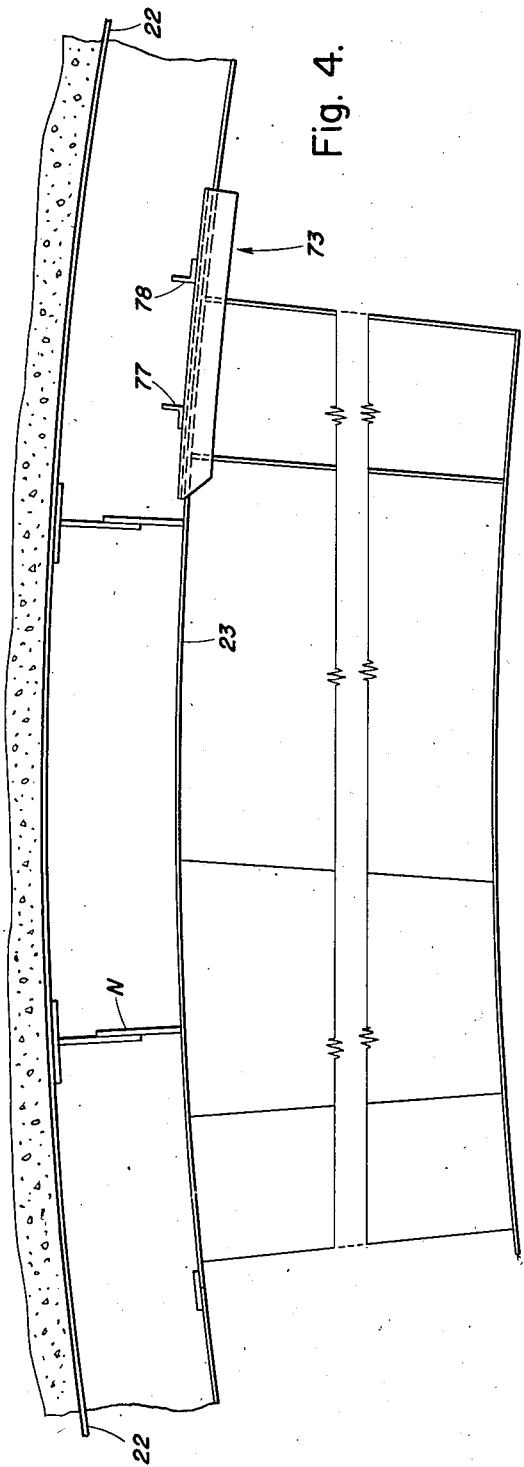
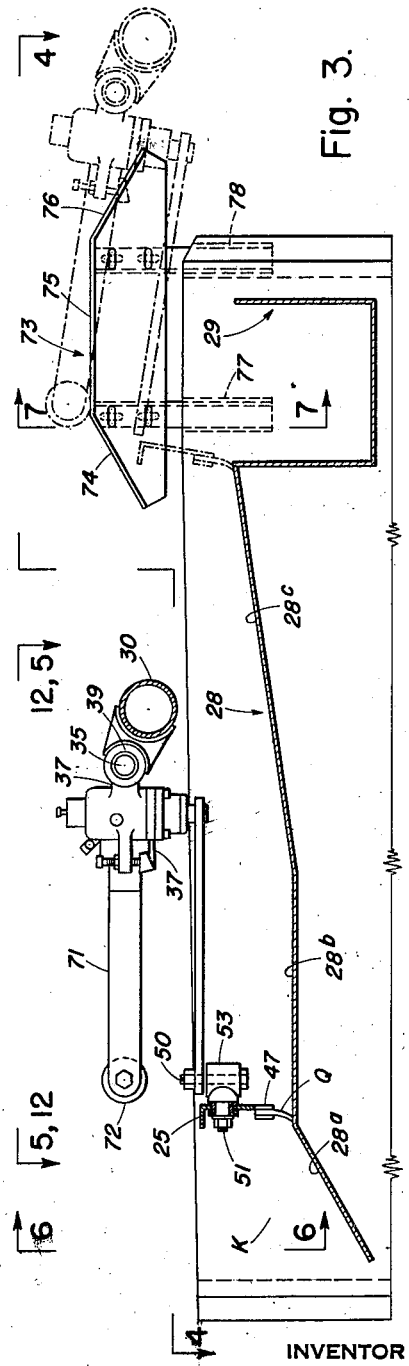
INVENTOR
Charles H. Scott
BY
ATTORNEY

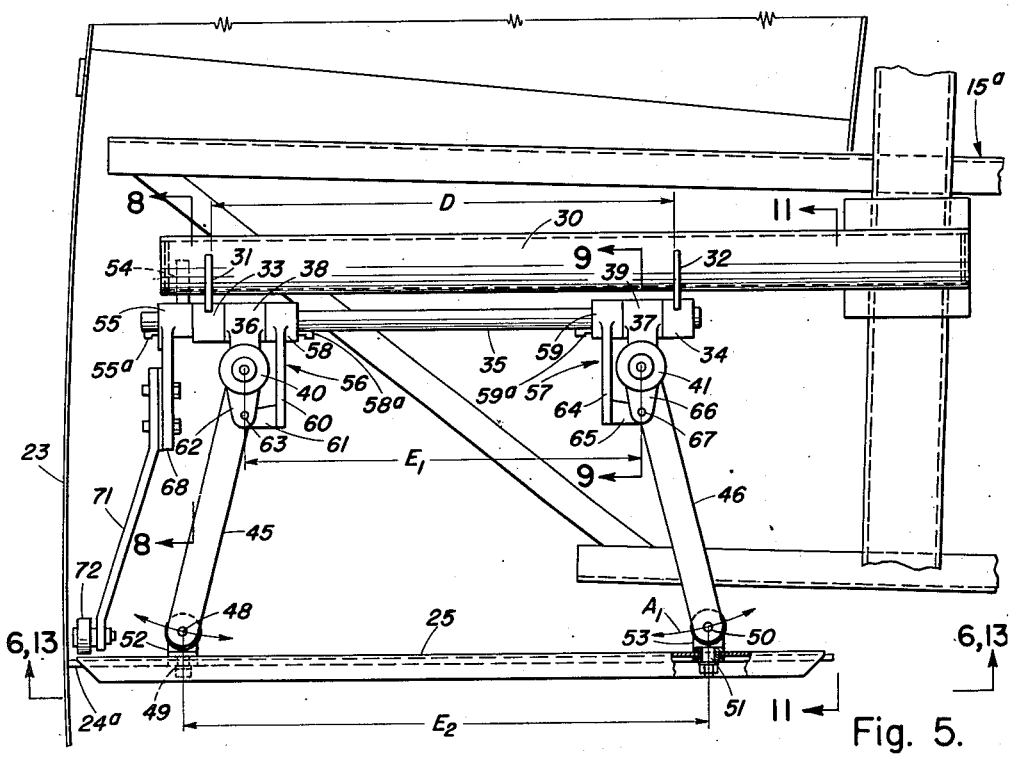
Fig. 5.
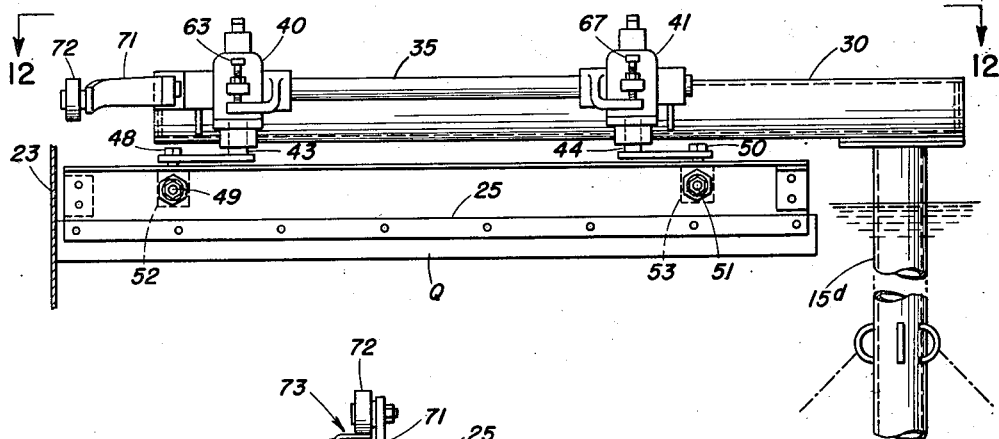
Fig. 7.
Fig. 6.
INVENTOR
Charles H. Scott
BY
Arthur Middleton
ATTORNEY

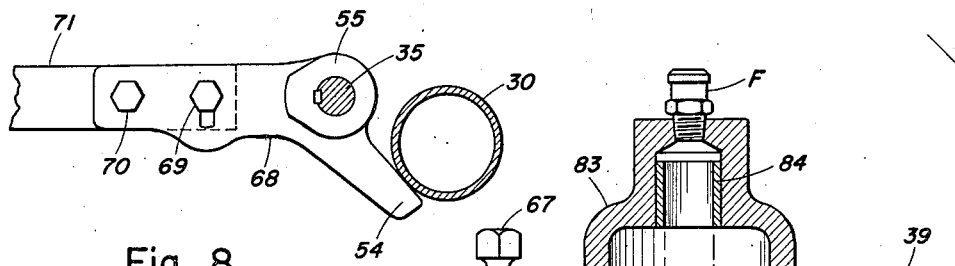
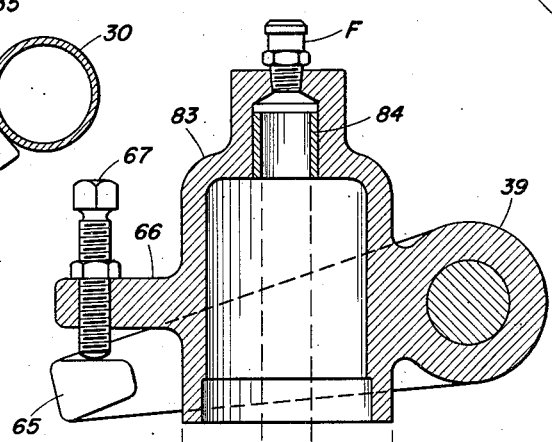
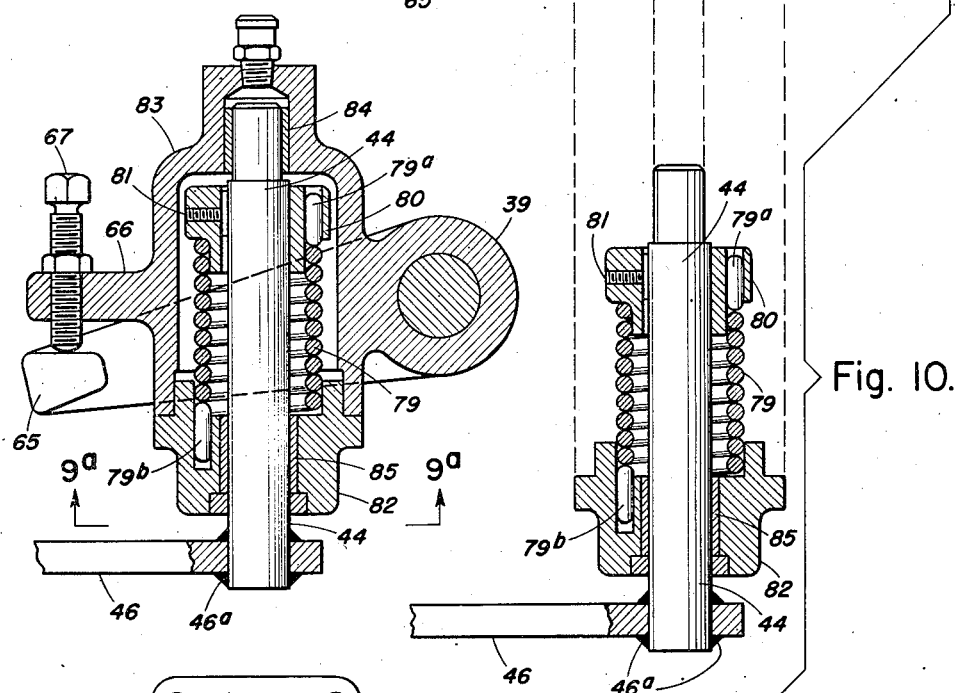
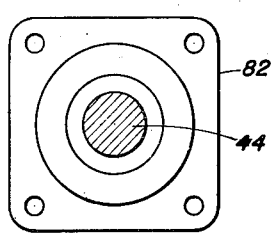

Sept. 23, 1952     C. H. SCOTT     2,611,489
SKIMMER MECHANISM FOR CLARIFIERS
Filed Feb. 21, 1951     5 Sheets-Sheet 5

INVENTOR
Charles H. Scott
BY
Arthur Middleton
ATTORNEY

Patented Sept. 23, 1952

2,611,489

UNITED STATES PATENT OFFICE 2,611,489

SKIMMER MECHANISM FOR CLARIFIERS

Charles H. Scott, Westport, Conn., assignor to The Dorr Company, Stamford, Conn., a corporation of Delaware Application February 21, 1951, Serial No. 212,040

5 Claims. (Cl. 210—55)

This invention relates to scum skimmers for round liquid treatment tanks. In such tanks solids-carrying liquid to be clarified is fed centrally to the tank while clarified liquid overflows into a discharge launder extending along the periphery of the tank, and a rotary raking mechanism conveys settled solids over the tank bottom to a point of withdrawal.

Any scum floating on or at the surface of the liquid in such a tank is usually prevented from overflowing into the peripheral discharge launder by an annular scum intercepting baffle which is supported from the tank wall a distance inwardly therefrom and extends parallel thereto as well as parallel to the peripheral launder and substantially concentric therewith.

More in particular this invention relates to improvements in the type of scum skimmer which comprises a skimmer blade carried by or rotating with the raking mechanism. The skimmer blade extends substantially radially of the tank, but is mounted upon the supporting raking mechanism in a manner whereby it is urged longitudinally outwardly into endwise pressure contact with the scum baffle. In this way the outer end of the skimmer acts as a scraper for clearing the scum baffle of scummy matter which tends to attach itself thereto. Besides keeping the scum baffle clear of adhering matter the skimmer blade conveys the scum along the baffle to a point of discharge namely into a radially extending scum trough having a discharge pipe leading downwardly and out of the tank. Usually a ramp is provided up which the radially extending skimmer blade is to push the collected scum into the radially extending discharge trough. Therefore this type of skimmer blade is also mounted to be vertically yieldable in order to enable it to ride up the ramp and over the discharge trough.

While the compound yieldability of the blade longitudinally and transversely in such a device enables the blade to override obstructions on the baffle as well as the obstruction offered by the ramp and discharge trough, some operational difficulty may occur when the outer end of the blade catches upon some such obstruction as a rivet-head or weld-bead or the like on the scum baffle or the like, with some resulting damage or deformation of the blade or of its supporting structure. A concurrent difficulty presents itself where the skimmer blade riding up the ramp fails to make proper contact with the face of the ramp along the length of the blade, when one end of the blade bears more heavily upon the ramp than the other, or when one end bears while the other does not.

One object of this invention is to provide improved blade supporting mechanism of such novel kinematic characteristics as will provide improved compound yieldability of the blade to allow the outer end of the blade to override more readily any non-scrapable obstruction or protrusion.

To this end, the invention provides an improved blade-supporting link mechanism of novel kinematic characteristics which will allow the outer end of the blade upon meeting the protrusion to respond yieldingly by swinging laterally rearwardly while also yielding longitudinally. Thus, the kinematic characteristics are such that the blade when overriding the obstruction at the outer end of the blade performs a compound angular and longitudinal movement. Such compound yielding movement, angularly and longitudinally, in a substantially horizontal plane is provided according to this invention by an improved link mechanism in which the blade supporting links are non-parallel, with the outer ends of the links spaced considerably farther apart from each other than the inner ends of the links. Because of the non-parallel arrangement of the links the outer pivotal point of the blade upon meeting the obstruction on the baffle will yield along an arcuate path pointing somewhat rearwardly while the inner pivotal point of the blade will move along an arcuate path pointing somewhat forwardly. In this way the blade upon encountering the obstruction reacts by being displaced not parallel to itself but in the compound angular and longitudinal manner above defined. In this way a force reaction is set up with respect to the outer end of the blade whereby the blade in being displaced by the obstruction offers less resistance to such displacement, so that the reaction forces are relatively greatly reduced in magnitude with the momentarily rearward angular displacement of the blade enabling its outer end to override the obstruction much more readily and smoothly, and substantially precluding undue strains or damage to the skimmer blade and its supporting mechanism.

Furthermore, each of the outer ends of the links also has with the blade a compound articulation which together with the articulation at the inner ends of the links enables the blade to adjust itself to the face of the ramp even though maintaining the blade in scum conveying position.

According to one feature the blade supporting mechanism comprises a rod about which are individually swingable a pair of compound bearing members having a vertical bearing portion for the inner ends of the links, and a compound articulation for the outer end of each link, so that the skimmer blade will adapt itself to the scum baffle and to the discharge ramp.

According to another feature a cam action device rotates the rod so as to lift the blade across the scum discharge trough.

Still another feature lies in the construction of what are herein termed the compound bearing members for supporting the inner ends of the non-parallel links, for rendering the links capable of the aforementioned compound angular yielding movement, namely horizontally as well as vertically. The feature lies in having a torsion spring combined in a novel manner with the compound bearing member, the spring to exert the pressure contact between the outer end of the blade and the scum baffle. That compound bearing member has a horizontal bearing portion and a vertical bearing portion. The vertical bearing portion comprises an inverted cup-shaped housing provided with a removable bottom closure piece. Assembled with the closure piece is a vertical upstanding rear pivot member of the link, the pivot member being rotatable and having an inner bearing in the closure piece. A torsion coil spring is assembled upon the closure piece and the pivot member, namely a torsion coil spring having its upper end anchored to the pivot member and its lower end to the closure piece, with the extreme free upper end portion of the pivot member having a bearing in the top end portion of the inverted housing. The subassembly which comprises closure piece, pivot member, and torsion spring can be withdrawn downwardly as a unit from the housing.

In the drawings:

Figure 3 is a greatly enlarged detail-sectional view of the skimmer device taken on line 3—3 in Figure 1, showing the skimmer blade coactive with the scum discharge trough.

Figure 4 is a plan view on line 4—4 of Figure 3 showing the scum trough with ramp, but with the skimming device proper omitted.

Figure 5 is a top view of the skimmer device further enlarged, taken on line 5—5 of Figure 4.

Figure 6 is a view of the skimmer device taken on line 6—6 of Figure 5.

Figure 7 is a detail-sectional view taken on line 7—7 of Figure 3.

Figure 8 is an end view of the skimming device taken on line 8—8 of Figure 5.

Figure 9 is an enlarged detail vertical sectional view of the skimmer device taken on line 9—9 of Figure 5.

Figure 9a is a bottom view taken on line 9a in Figure 9.

Figure 10 is a view of the parts of Figure 9 drawn apart.

Figure 2:
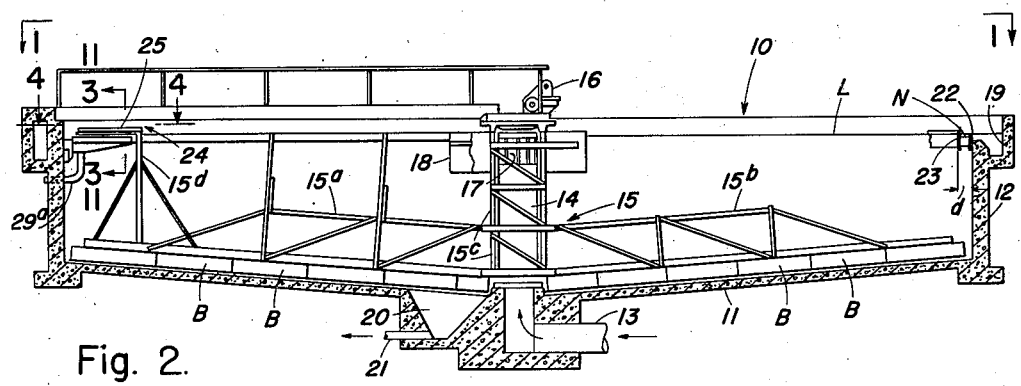
Figure 2 is a sectional view of the tank taken on line 2—2 of Figure 1.
Figure 1:
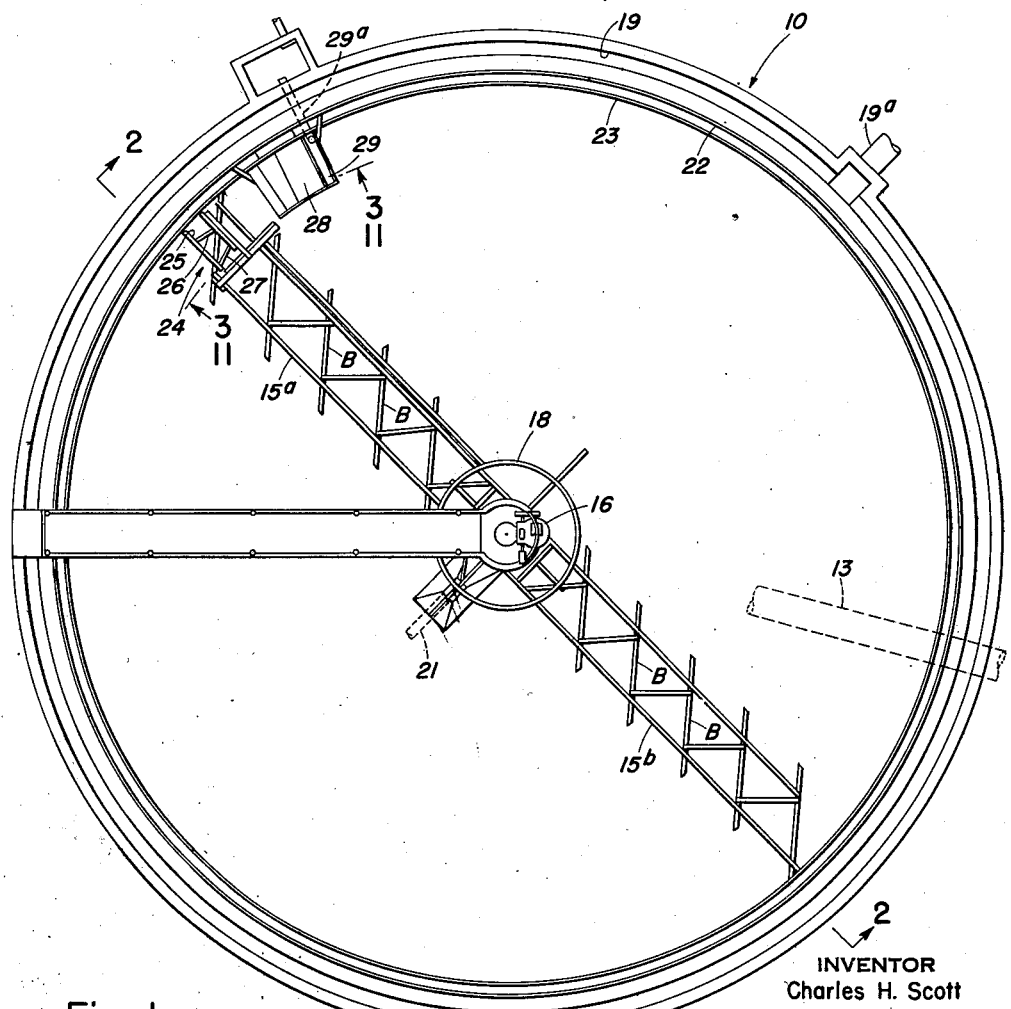
Figure 1 is the plan view of a clarifier tank having rotary sediment raking mechanism in association with the improved scum skimmer device.

The improved skimmer device according to this invention is shown embodied in a round clarifier tank 10 (see Figures 1 and 2) having a bottom 11 and an upstanding wall 12. An inlet conduit 13 feeds solids-carrying liquid centrally through the bottom into the tank, namely upwardly through a customary hollow center pier 14 which supports and about which revolves a customary rotary sediment raking structure 15 driven by power drive means 16 also supported upon the pier, the raking structure 15 comprising a pair of rake arms 15a and 15b unitary with and extending from a central structural frame portion 15c surrounding the pier 14 and rotatably supported from the top thereof and rotated by the power drive means 16.

The solids carrying feed liquid passes through lateral openings 17 in the top end of the pier and flows past the lower edge of a cylindrical baffle 18 which surrounds the top end portion of the pier and then towards and into a peripheral overflow launder 19 provided at and formed by the top end portion of the tank wall, while solids settle from the liquid to the tank bottom where they are being conveyed by the rotation of the raking structure inwardly towards the central portion of the bottom and to a sump 20 having a discharge conduit 21. The overflow launder 19 has a discharge connection 19a. The arms of the raking structure are provided with the customary raking blades B effective to convey the sediment from the outer zones of the tank bottom to and into the sump incident to the rotation of a structure. The liquid level L in the tank is defined by a peripheral overflow weir or edge 22 which has concentric therewith a cylindrical scum intercepting baffle briefly termed scum baffle 23 spaced a distance $d$ from the weir. Floating matter or scum is prevented from passing into the overflow launder by the baffle 23. A skimmer device for collecting scum at and along the scum baffle is indicated at 24 and is carried by the rotary rake structure 15 and particularly by a vertical member 15d thereof. The skimmer device operates to collect the scum along the baffle by means of a skimmer blade 25.

Since the invention relates to improvements in the functioning of the skimmer blade, the skimmer device will be dealt with in greater detail further below. Suffice it here to say that the skimmer blade is carried by a pair of link members 26 and 27 (see Figure 1) in such a manner that the blade may yield longitudinally with the link members swinging in a substantially horizontal plane when yielding to an obstacle or protrusion encountered on the scum baffle 23, and that the links may also swing upwardly from their normal horizontal position as the blade rides up a scum discharge ramp 28 leading to a radially extending scum receiving discharge trough 29. Indeed, it will be shown in greater detail below that each of the links 26 and 27 is upwardly yieldable individually in a manner which enables the skimmer blade to function in an approved self-adjusting manner in overriding the ramp. In this way the skimmer blade is normally supported in horizontal scum collecting position with the outer end of the blade being urged by spring means into pressure engaging the scum baffle for removing from the baffle scummy matter adhering thereto as the outer end of the blade travels along the scum baffle with the rotation of the sediment raking structure 15.

When the skimmer blade 25 rides up on the ramp to push the collected scum up the ramp and into the scum trough 29 having a discharge connection indicated at 29a, the horizontally swingable link members 26 and 27 being also upwardly swingable individually allow the blade 25 to adjust itself in a novel manner whereby the blade contacts the face of the ramp uniformly.

But as the blade 25 reaches the scum trough at the upper end of the ramp a cam device to be described further below becomes effective for carrying the skimmer blade across the discharge trough 29 and for subsequently lowering the blade to its normal scum collecting position with respect to the liquid level in the tank.

A scum skimming device as shown in Figures 3, 5, 6 and 7 comprises a beam 30 mounted upon one outer end of arm 15a of the sediment raking structure 15 and rigidly fastened thereto by way of being connected to the aforementioned vertical member 15d. The beam 30 is shown to be of tubular shape and has fixed to it a pair of brackets 31 and 32 spaced a distance D apart from each other and provided with hub portions 33 and 34 for carrying therein a rocker shaft 35. The rocker shaft 35 carries a pair of swingable bracket members 36 and 37 formed with hub portions 38 and 39 respectively to constitute horizontally disposed bearing portions whereby these bracket members are individually swingable upon and relative to the rocker shaft 35. The bracket members 36 and 37 are furthermore formed with vertical bearing portions 40 and 41 respectively, in which are rotatable short vertical shafts or pin members 43 and 44 respectively held against axial displacement within their respective bearing portions 40 and 41 in a manner to be described in greater detail and in conjunction with detail Figure 9 below. The pin members 43 and 44 are unitary with a pair of arms or link members 45 and 46 respectively which correspond to similar link members indicated at 26 and 27 respectively in Figure 1 fixed to the lower ends of the pin members, which link members have their forward ends connected with the skimmer blade 25 in such a manner that the link members are non-parallel, with a spacing $E_1$ of their inner ends from each other being smaller than the spacing $E_2$ of their outer ends.

It is noteworthy that articulated connections are provided between the outer ends of link members 45 and 46 and the skimmer blade 25. These connections provide universal articulation by reason of the compound effect of movement about a vertical pivot 48 as well as a horizontal pivot 49 for link member 45, and movement about a vertical pivot 50 and a horizontal pivot 51 for link member 46. The associated pivots 48 and 49 for link member 45 are mounted in and are unitary with a T-shaped member 52, while the pivots 50 and 51 are mounted in and are unitary with a T-shaped member 53.

In order to establish the normal horizontal skimming position of the skimmer blade 25 there is provided a lug 54 fixed to the rocker shaft 35 by means of a hub portion 55 and key 55a (see also Figure 8) the lug 54 engaging under the beam or arm 30; and there are also provided a pair of stop members 56 and 57 for sustaining the bracket members 36 and 37 respectively, the stop members having hub portions 58 and 59 respectively, whereby they are fixed to the rocker shaft 35 as is indicated by keys 58a and 59a respectively. The stop member 56 comprises an arm 60 the outer end of which is formed with a lateral outwardly extending lug 61 to serve as a stop for a companion lug 62 extending from the bracket member 36 and having a set screw 63 whereby it rests adjustably upon the companion lug 61. Similarly the stop member 57 comprises an arm 64 having a lateral outwardly extending lug 65 to serve as a stop for a companion lug 66 extending from the bracket member 37 and having a set screw 67 whereby it rests adjustably upon its companion lug 65.

The hub portion 55 besides having the lug 54 is formed with an extension 68 to which is fastened as by means of bolts 69 and 70 (see Figure 8) an arm 71 with a cam roller 72 mounted upon the free end thereof. This cam roller is adapted to engage directly upon a track member 73 (see Figure 3) which comprises an ascending sloping portion 74, a horizontal intermediate portion 75 and a descending sloping portion 67. The track member 73 is rigidly mounted upon the annular scum baffle 23 as by means of a pair of vertical angle irons 77 and 78. The track member 73 serves the purpose of lifting the skimmer blade 25 across the scum receiving trough 29, as is indicated by the dot-and-dash line position of the skimming device in Figure 3. That is to say, the cam roller 72 engaging and riding up on the track member 73 turns the rocker shaft 35 and with it through set screws 63 and 66 the stop members 56 and 59 thus swinging the link members 45 and 46 upwardly and thereby lifting the skimmer blade clear of the scum discharge trough 29. The cam roller then descends along track portion 76 to allow the lug 54 to re-engage the beam 30, thereby re-establishing the normal scum conveying position of the skimmer blade 25.

Referring more particularly to detail Figures 9 and 9a of the swingable bracket member 37 (which is identical to bracket member 36) it is to be noted that this bracket member contains a torsion coil spring 79 surrounding the pin member 44. The upper end 79a of this torsion coil spring is anchored in and held by a collar 80 fixed to the pin member 44 as by set screw 82, whereas the lower end 79b of the spring is anchored in and held by a bottom closure member 82 fastened to the lower open end of a housing portion 83 which is of inverted cup shape and which is integral with the hub portion 39 and with the lug 66 bearing the set screw 67. The pin member 44 has an upper bearing 84 in the top end of the cup shaped housing portion 83 and a lower bearing 85 in the closure member 82. The link member 46 is fixed to the lower end of pin member 44 as is indicated by welding points 46a. The spring 79 is torsionally tensioned sufficiently to urge the link member 46 in the direction of arrow $A_1$ (see Figure 5) thereby urging the outer end 24a of the skimmer blade 24 into adequate pressure contact with the scum baffle 23.

Figure 10 illustrates the feature that the link member 46 together with the pin member 44, the closure member 82, the spring 79 and the collar 80 constitute an assembly unit which can be readily withdrawn as such downwardly from the housing portion 83 for inspection or adjustment of the spring 79. The torsional tension of this spring can thus be readily adjusted by rotationally setting the collar 80. A grease fitting F is provided at the top end of the housing portion 83.

*Operation*

Solids bearing liquid containing scum forming constituents enters the tank 10 centrally from the bottom, rises in the hollow center pier, and then from the top end thereof through openings 17 flows radially in all directions towards the periphery of the tank and into the overflow launder 19 while depositing settleable solids upon the tank bottom, yet carrying floating scummy matter to where it is intercepted by the annular scum baffle 23.

As the sediment conveying rake structure 15 rotates being driven by motor 16, it not only carries the settled solids as sludge to the sump 20, but it also allows the skimmer blade 25 to collect scum along the scum baffle with the outer end 24a of the skimmer blade in spring-urged pressure contact with scum baffle 23 and thus effective to scrape from the baffle any scummy matter adhering thereto. The normal horizontal scum collecting position of skimmer blade 24 is defined by the lug 54 engaging the underside of beam 30 and by the set screws 63 and 67 resting upon lugs 61 and 65 respectively of stop members 56 and 57 which, it will be remembered, are fixed upon shaft 35.

Figure 12:
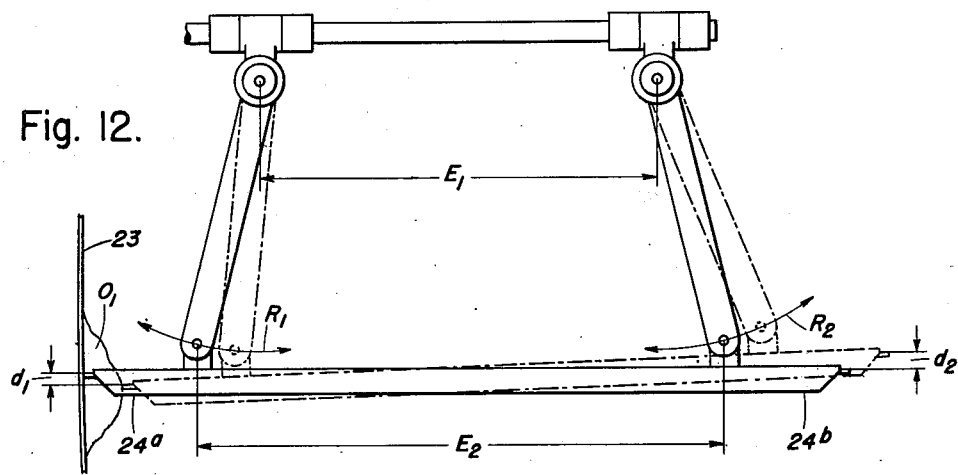

During the scum collecting and scraping operation of the skimmer blade 24 the non-parallel arrangement of link members 45 and 46 enables the skimmer blade to yield readily lengthwise when it encounters any non-scrapable obstacle protruding from the inner face of the scum baffle, for example a rivet-head or weld-bead or the like. The manner in which the skimmer blade yields to such an obstacle lengthwise is illustrated in Figure 12 where an exaggerated example of a non-scrapable protrusion is shown at $O_1$. What enables the skimmer blade 24 to more readily override such an obstacle while reducing unfavorable stress reaction upon the supporting mechanism of the blade is the fact that the blade with such non-parallel arrangement yields by way of a compound lengthwise and angular movement. With such compound movement the outer end portion 24a of the blade moves along a path defined by arrow $R_1$ while the inner end 24b of the skimmer blade moves along a path defined by arrow $R_2$. Thus it will be noted that due to the non-parallel arrangement while the blade is forced away lengthwise by the obstacle $O_1$ the outer end 24a of the blade recedes a distance $d_1$ while the inner end advances a distance $d_2$. In this way the blade in overriding the obstacle $O_4$ becomes displaced not only lengthwise but also angularly and it is this added angular component movement which facilitates the overriding of the obstacle by the blade.

Figure 11:
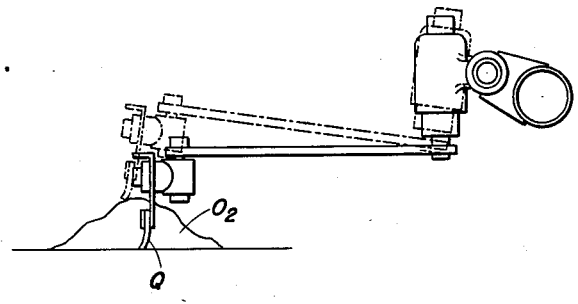
Figures 11, 12, 13 are side-, top-, and front-views of the skimmer device illustrating how the blade adjusts itself in a universal manner when overriding projections encountered by the outer end of the blade as well as by the longitudinal edge thereof.
Figure 13:
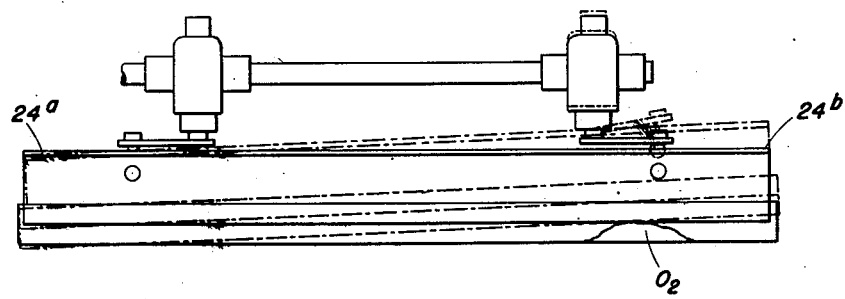

At that, the skimmer blade 24 is also enabled to override an obstacle $O_2$ which may be encountered by its horizontal bottom edge, such incident being indicated in Figures 11 and 13. It is because of the provision of the swingable bracket members 36 and 37 together with the universal articulations between the skimmer blade and the link members 45 and 46 that the blade is enabled to override the obstacle $O_2$ by way of yielding tiltingly as illustrated in Figure 13 showing the end portion 24b of the blade rising above the other end portion 24a as the blade adjusts itself to the obstacle. By the same token the skimmer blade adjusts itself to the face of the ramp 28 so that a squeegee Q of flexible resilient material such as rubber provided upon the blade rests evenly along its length upon the ramp. Due to this self-adjusting feature of the skimmer blade the scum is carried effectively onto and over the ramp to the discharge trough 29 with a minimum of wear and tear to the squeegee. When the skimmer blade approaches the edge of the discharge trough 29 (as indicated in the dot-and-dash line position of the mechanism in Figure 3) the track member 73 takes over the positioning control of the skimmer blade due to the track member being engaged by cam roller 72 to effect raising the blade sufficiently for carrying it across the scum discharge trough 29. That is to say, the skimmer blade 24 with a floating scum load in front of it approaches the ramp 28 as indicated by the full-line position of the mechanism with the blade in its normal horizontal scum collecting position, then engages the steep and partly submerged ascending sloping portion 28a of the ramp with the weight of the blade now coming to rest upon the ramp, the blade then to ride up onto the horizontal portion 28b of the ramp and then further up the next following shallow ascending portion 28c. With the weight of the blade resting upon the ramp it is notable that the present self-adjusting construction of the blade-supporting mechanism allows the weight of the blade to be uniformly distributed along its length so that the squeegee Q will engage the ramp uniformly and at a uniform pressure along its entire length, that is in a manner highly desirable for the purpose of effectively discharging the scum at a minimum wear and tear upon the squeegee portion of the skimmer blade.

In case it should be necessary or desirable to adjust, inspect, service or replace the torsion spring 79, one merely has to loosen the bolts which fasten the closure member 82 to the housing 83, whereupon (see Figure 10) the parts including the torsion spring can be withdrawn from the housing 83 together with closure member 82 and link member 46 as a sub-assembly unit. The torsional tension of spring 79 may be adjusted by rotationally re-setting the anchoring collar 80.

I claim:

1. In a liquid treatment tank for clarifying liquid being fed thereto, having peripheral overflow means, a scum baffle concentric with said overflow means, sediment outlet means, sediment conveying means for conveying sediment over the tank bottom to said outlet means, a radially extending scum discharge trough, a scum skimming device comprising a scum collecting skimmer blade extending radially with respect to the tank, and blade supporting means rotatable with said raking means for rendering the blade capable of compound yieldability longitudinally and transversely, said blade having yieldable endwise pressure contact with the baffle for scraping the same free of scum matter adhering thereto, characterized by the fact that the blade supporting means comprise a support rotating with the raking means, a pair of non-parallel links substantially horizontally disposed with the outer ends of said links being spaced from one another farther apart than the inner ends, a compound bearing member carried by said support for the inner end of each link whereby the link is swingable about a vertical axis as well as about a horizontal axis, said blade having articulated connection with the outer end of each link whereby each link may yield angularly horizontally as well as vertically to obstacles encountered in the path of the blade while maintaining the blade in scum skimming position, and adustable stop means upon said support for determining the lower limit position of said links.

2. The device according to claim 1, in which said articulated connection is a compound articulated connection.

3. In a liquid treatment tank for clarifying liquid being fed thereto, having peripheral overflow means, a scum baffle concentric with said overflow means, sediment outlet means, sediment conveying means for conveying sediment over the tank bottom to said outlet means, a radially extending scum discharge trough, a scum skimming device comprising a scum collecting skimmer blade extending radially with respect to the tank, and blade-supporting means rotatable with said raking means for rendering the blade capable of compound yieldability longitudinally and transversely, said blade having yieldable endwise spring pressure contact with the baffle for scraping the same free of scum matter adhering thereto; characterized by the fact that the blade-supporting means comprise a horizontal arm rotating with the raking means, a pair of brackets spaced from one another and fixedly extending from said arm, a rod fixedly supported by said brackets, a pair of spaced apart compound bearings carried by said rod, each said bearing having a horizontal bearing portion surrounding said rod so as to be swingable thereon about a horizontal axis, and also having a vertical bearing portion, a pair of horizontally spaced apart substantially horizontally disposed links each of which has its inner end carried by a respective vertical bearing portion whereby said links can yield horizontally as well as vertically, the outer ends of said links having articulated connection with said blade, and stop means for determining the lower limit position of said links and thereby the normal scum skimming position of the blade, said stop means comprising a lug fixedly extending from each bearing and adjustable stop means between each lug and said rod.

4. In a liquid treatment tank for clarifying liquid being fed thereto, having peripheral overflow means, a scum baffle concentric with said overflow means, sediment outlet means, sediment conveying means for conveying sediment over the tank bottom to said outlet means, a radially extending scum discharge trough, a scum skimming device comprising a scum collecting skimmer blade extending radially with respect to the tank, and blade-supporting means rotatable with said raking means for rendering the blade capable of compound yieldability longitudinally and transversely, said blade having yieldable endwise spring pressure contact with the baffle for scraping the same free of scum matter adhering thereto; characterized by the fact that the blade-supporting means comprise a horizontal arm rotating with the raking means, a pair of brackets spaced from one another and fixedly extending from said arm, a rod rotatably supported by said brackets and having a stop rigid therewith and engaging the underside of said arm as a stop, a pair of spaced apart compound bearings carried by said rod, each said bearing having a horizontal bearing portion surrounding said rod so as to be swingable thereon about a horizontal axis, and also having a vertical bearing portion, a pair of horizontally spaced apart links each of which has its inner end carried by a respective vertical bearing portion whereby said links can swing horizontally as well as vertically, the outer ends of said links having articulated connection with said blade, adjustable stop means effective between said rod and said compound bearings for determining together with said stop lug the lower limit position of said links and thereby the normal scum skimming position of the blade, with the addition of a cam action device for automatically lifting said blade over and across said scum discharge trough, comprising an arm fixedly extending from the outer end of said rod with a cam roller carried by the end of said arm, and a fixed cam member carried by the tank and so disposed and engaged by said cam roller as to lift said blade across said trough by rotating said rod.

5. In a liquid treatment tank for clarifying liquid being fed thereto, having peripheral overflow means, a scum baffle concentric with said overflow means, sediment outlet means, sediment conveying means for conveying sediment over the tank bottom to said outlet means, a radially extending scum discharge trough, a scum skimming device comprising a scum collecting skimmer blade extending radially with respect to the tank, and blade-supporting means rotatable with said raking means for rendering the blade capable of compound yieldability longitudinally and transversely, said blade having yieldable endwise spring pressure contact with the baffle for scraping the same free of scum matter adhering thereto; characterized by the fact that the blade supporting means comprise a horizontal arm rotating with the raking means, a pair of brackets spaced from one another and fixedly extending from said arm, a rod fixedly supported by said brackets, a pair of spaced apart compound bearings carried by said rod, each said bearing having a horizontal bearing portion surrounding said rod so as to be swingable thereon about a horizontal axis, and also having a vertical bearing portion in the form of an inverted cup-shaped housing, a removable bottom closure piece for the housing with a pivot member being rotatable therein as well as in the top end portion of the housing and a torsion coil spring surrounding said pivot member and having its one end anchored upon the closure piece and its other end anchored upon the pivot member, and a pair of horizontally spaced apart links each of which has its inner end carried by a respective vertical bearing portion whereby said links can swing horizontally as well as vertically with said inner ends being fixed to the lower ends of respective pivot members.

CHARLES H. SCOTT.

REFERENCES CITED

The following references are of record in the file of this patent:

UNITED STATES PATENTS

| Number | Name | Date |
|---|---|---|
| 1,662,703 | Hebden | Mar. 13, 1928 |